(12) United States Patent
Masschelein et al.

(10) Patent No.: US 10,455,645 B2
(45) Date of Patent: Oct. 22, 2019

(54) HEATED GLASS PANEL

(71) Applicant: AGC Glass Europe, Louvain-la-Neuve (BE)

(72) Inventors: Peter Masschelein, Huldenberg (BE); Zoltan Kazik, Vilvoorde (BE)

(*) Notice: Subject to any disclaimer, the term of this patent is extended or adjusted under 35 U.S.C. 154(b) by 11 days.

(21) Appl. No.: 15/317,824

(22) PCT Filed: May 28, 2015

(86) PCT No.: PCT/EP2015/061809
§ 371 (c)(1),
(2) Date: Dec. 9, 2016

(87) PCT Pub. No.: WO2015/189039
PCT Pub. Date: Dec. 17, 2015

(65) Prior Publication Data
US 2017/0135160 A1    May 11, 2017

(30) Foreign Application Priority Data

Jun. 12, 2014  (EP) .................................... 14172152

(51) Int. Cl.
*H05B 3/84* (2006.01)
*H05B 3/06* (2006.01)

(52) U.S. Cl.
CPC ............... *H05B 3/84* (2013.01); *H05B 3/06* (2013.01); *H05B 2203/011* (2013.01)

(58) Field of Classification Search
CPC ... H05B 3/84; H05B 3/06; H05B 3/86; H05B 3/0042; H05B 2203/011; H05B 2203/017;
(Continued)

(56) References Cited

U.S. PATENT DOCUMENTS 3,772,075 A * 11/1973 Tarnopol ............. C03C 17/3642
106/1.11
5,451,280 A    9/1995 Gillner
(Continued)

FOREIGN PATENT DOCUMENTS

DE           43 16 575 C1    7/1994
DE   10 2007 004 953 A1    7/2008
(Continued)

OTHER PUBLICATIONS

International Search Report dated Jul. 29, 2105, in PCT/EP2015/061809, filed May 28, 2015.

*Primary Examiner* — Shawntina T Fuqua
(74) *Attorney, Agent, or Firm* — Oblon, McClelland, Maier & Neustadt, L.L.P.

(57) ABSTRACT

The invention relates to a laminated motor vehicle glass panel which consists of two glass sheets joined by means of an intermediate sheet, the glass panel comprising a system of heated layers which is applied to one of the sheets and, to the edge of the same sheet, a substantially opaque masking strip, in contact with the glass sheet, the system of heated conductive layers at least partially covering the masking strip. The glass panel further comprises power supply busbars in contact with the system of layers in the portion covering the masking strip, characterized in that the masking strip has a roughness no greater than 0.5μ and preferably no greater than 0.1μ.

21 Claims, 1 Drawing Sheet

Figure 1:
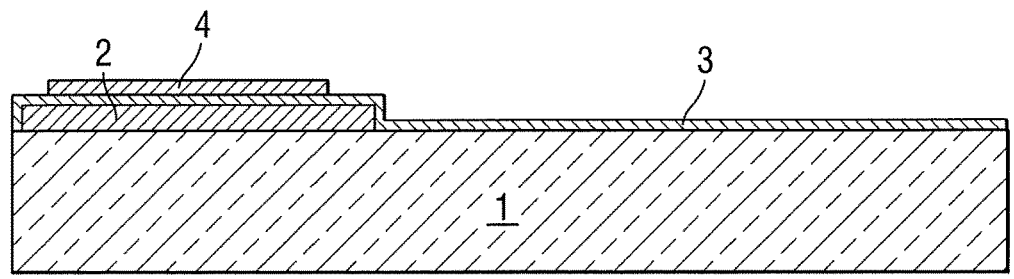

(58) Field of Classification Search
CPC .......... H05B 2203/013; H05B 2203/01; H05B 2203/031; C23C 18/1608; C23C 18/1653; C03C 17/3642; C03C 17/3644
See application file for complete search history.

(56) References Cited

U.S. PATENT DOCUMENTS

| | | |
|---|---|---|
| 2004/0084432 A1 | 5/2004 | Schwartz et al. |
| 2010/0059494 A1 | 3/2010 | Keite-Telgenbuescher et al. |
| 2010/0252544 A1 | 10/2010 | Marquet |
| 2010/0308030 A1 | 12/2010 | Maurin-Perrier et al. |

FOREIGN PATENT DOCUMENTS

| | | | |
|---|---|---|---|
| FR | 2 927 218 A1 | | 8/2009 |
| FR | 2927218 | * | 8/2009 |
| JP | 3129505 B2 | | 1/2001 |
| WO | 2004/028212 A1 | | 4/2004 |
| WO | 102001004953 | * | 7/2008 |
| WO | 2009/053469 A2 | | 4/2009 |

* cited by examiner

HEATED GLASS PANEL

The invention relates to motor vehicle glass panels comprising a system of conductive layers which is intended to heat the glass panel. More specifically, the invention relates to the improvement in the performance of these glass panels by the conditions under which the system of layers is supplied.

In practice, layered heated glass panels are connected to the electrical supply by means of conductors applied to the edges of the glass panel and in contact with the layers. In practice, the electrical contact between the conductors in question, which are denoted under the name of busbars, and the system of layers is not always provided under the best conditions. The irregularities in this contact have, as consequence, a distribution of the power which is not optimized, on the one hand, and, on the other hand, the formation of favored regions for the passage of the current, creates what is denoted under the name of "hot spots". Even if the latter remain within temperatures which can be endured by the materials used in forming the glass panel, the nonhomogeneous distribution of the power limits the performances achieved.

Under the most usual conditions, as the voltage which can be applied is limited—most generally to 12-14 V for private vehicles—and it is not possible for the resistance of the layers to be lowered for optical reasons related to the light transmission of these glass panels, the effective power available is limited. It is necessary to move nearer to conditions which are targeted at devoting virtually all of this power to the heating of the glass panel. Any loss of power limits the heating performances. This loss of power is particularly troublesome for the glass panels exhibiting the greatest dimensions. In vehicles, the glass panels making the greatest demands are the windshields. Subsequently, the invention is described with reference to windshields, it being understood that the proposals also apply to glass panels of more modest dimensions.

The structure of the heated glass panels, apart from the layers and busbars, most generally comprises elements intended to mask the unsightly elements. For glued glazings, the irregular strand of glue would be visible from the outside, unless the corresponding region of glueing necessarily located on the edge of the glass panel was rendered opaque. The busbars are also among the elements which have to be masked.

The masking of the edges of the glass panel is conventionally carried out by application of an enamel composition which renders this region of the glass panel in practice completely opaque. The light transmission in the coated region is, for example, less than 1% and can usually be less than 0.1%.

The application of the enamel composition is conventionally carried out by a screen printing technique. The application having been carried out, the composition is baked in order to form the enamel layer. This "baking" is either a one-stage baking or a two-stage baking. In the second case, that most often followed in the production of laminated glass panels, a first baking results in the removal of the solvents, which temporarily stabilizes the printed pattern, and a second baking results in the melting of the frit present in the composition. These two stages generally correspond to two moments in the preparation of the glass panels. The first is carried out on the sheet on which the composition is applied and the second advantageously corresponds to the bending heat treatment.

In laminated glass panels, in particular windshields, the masking enamel is necessarily applied at least to the sheet directed toward the outside of the vehicle. The system of heated layers is also advantageously applied to this sheet in order to optimize the heating necessary for the deicing. The busbars are positioned on the system of conductive layers facing the enamelled regions. All these elements are located on the face of the sheet in contact with the thermoplastic interlayer, the face 2 in the conventional designation which numbers the faces of the sheets from the outside of the glass panel.

The inventors have analyzed the behavior of the bond between the system of conductive layers and the busbars. They have shown that the power delivered to the busbars is not completely transmitted to the conductive layers. This results in a loss of power harmful to the heating performances of the glass panel. The study of the origin of this loss of power has made it possible to identify certain factors which, when taken into account, can result in an improvement in these performances.

The invention results from this identification and from the way of overcoming the causes of this loss of power. The invention is the subject matter of claim 1, which relates to the influence of the roughness.

The precise causes which mean that the roughness of the support on which the system of layers rests influences the effective power of the heating are not fully determined. One hypothesis is that the roughness results in a system of layers which is nonuniform, in particular in its thickness. Another hypothesis is that the contact between the busbar and the system of layers becomes better established as the roughness decreases. The two mechanisms may possibly occur simultaneously.

Independently of these hypotheses, experience confirms the importance of this factor. The elements which detrimentally affect the homogeneity of the electrical conduction are necessarily reflected by local variations in the intensity, a source of loss of effective power available for the system of layers which is applied to the glass sheet to be heated.

Obtaining masking strips, the surface roughness of which is less than 0.5μ and preferably lower than 0.1μ and particularly preferably lower than 0.05μ, depends on the techniques for forming these strips.

The roughness can be defined in several ways. In the present patent application, the mean roughness measured from a base line, referred to as arithmetic roughness Ra, is chosen.

The normal techniques of screen printing do not give surfaces having a roughness of the order indicated above.

An improvement in the roughness can be obtained by choosing screens, the coating surface of which is itself only very slightly rough, such as those sold by SEFAR with the PCF references. Their roughness is not usually less than 2 or 3μ but the roughness of the coating surface of the screen does not correspond exactly to that of the layer produced. A natural smoothing can be obtained by varying the surface tension in the layer applied, if the viscosity is appropriate.

The means used are not the only ones participating in the determination of the roughness. The enamel compositions include solid particles of frit and of opacifying products (particles of carbon and/or pigments). While the particles of frit are melted in the enamel during the baking, the other particles remain without major modification, and even coated in the molten frit, can also contribute to the roughness of the layer. Previously in the screen printing techniques employed to form masking patterns, considerations relating to the opaqueness were favored, resulting in pigments of relatively large dimensions of the order of several tens of micrometers. In order to result in a roughness corresponding to the conditions of the invention, it is preferable for the particles included in the enamel compositions not to be of dimensions much greater than the desired roughness. Preferred dimensions are thus less than 5μ and particularly preferably less than 3μ.

Furthermore, the screen printing techniques result in coatings which exhibit a certain thickness. By way of indication, in conventional applications, the enamel layers can have a thickness of 20 to 150μ. These thicknesses, for the reasons set out later, also have an effect on the behavior of the conductive layers which cover the enamel strips.

Apart from a possible improvement in the screen printing techniques, the inventors also propose to employ other means of application of the masking compositions and in particular the application of the compositions according to an "inkjet" technique. This method of spraying makes it possible to escape certain constraints related to the screen printing method. The droplets have dimensions far smaller than the openings of the meshes of the screen printing screens. Furthermore, the absence of contact between the applicator and the substrate prevents any impression of this applicator on the layer formed, the characteristics of which then depend only on those of the composition sprayed.

In order to make possible good use of the spray nozzles, the compositions necessarily have to include particles of limited dimensions. While the nature of the constituents of the masking compositions can be similar to that of the screen printing compositions, subject to an adjustment in particular in the content of binders in order to maintain a viscosity compatible with this method of application, the dimensions of the particles have to be adjusted not only to allow the use of the nozzles without the risk of these becoming obstructed but also in order to obtain an appropriate viscosity. The particles of the compositions used according to the invention are advantageously of less than 1μ and preferably of less than 0.5μ.

Techniques for forming masking strips by the inkjet method have been provided previously, in particular in the publication WO 2005/00348 of the applicant company. The techniques described were nevertheless directed particularly toward the choice of specific compositions making possible a recycling of the coated glass. The determination of the methods of application, in view of the compositions in question, was essentially targeted at obtaining a sufficient opacification. The use of these masking layers and their contact with the conductive layers, which are the subject matter of the present invention, were absent from this prior art.

Beyond the characteristics of roughness of the masking strips, the inventors have also sought to reduce the losses of power in the improvement of the transition at the limit of these strips. The system of conductive layers is formed of a superimposition of metal layers and dielectric layers. In order to achieve the best conductivities, in other words the lowest resistance, with a good light transmission and a sufficiently neutral coloration, the systems are currently composed of several metal layers, in particular silver layers. These systems of layers, independently of the number of the latter, have a limited total thickness, generally not exceeding 0.3μ. In all cases, the thickness of these layers is much less than that of the conventional masking strips, as indicated above. The continuity of the conductive layers applied both to the masking strips and to the glass sheet cannot be suitably assured at the edge of these strips.

In order to solve this problem, the inventors propose to form masking strips, the edge of which turned toward the center of the sheet is of gradually decreasing thickness.

The structure proposed can be obtained in screen printing techniques, for example by using a screen exhibiting a variable meshwork. The use of screen printing nevertheless remains dependent on a thickness which cannot be reduced absolutely continuously. There remains, at the edge of the strip, a thickness of an order of magnitude much greater than that of the layers. The difficulty is thus reduced but not completely removed.

The technique of application by the inkjet method offers increased possibilities of adjustment of the thickness. This is possible by a gradual variation in the density of the droplets sprayed per unit of surface area. It is also possible to carry out, under unvarying conditions of spraying, the superimposition of applications corresponding to a fraction of the total thickness desired while gradually reducing the width applied, each application being carried out set back with reference to the limit of the preceding application.

Figure 2:
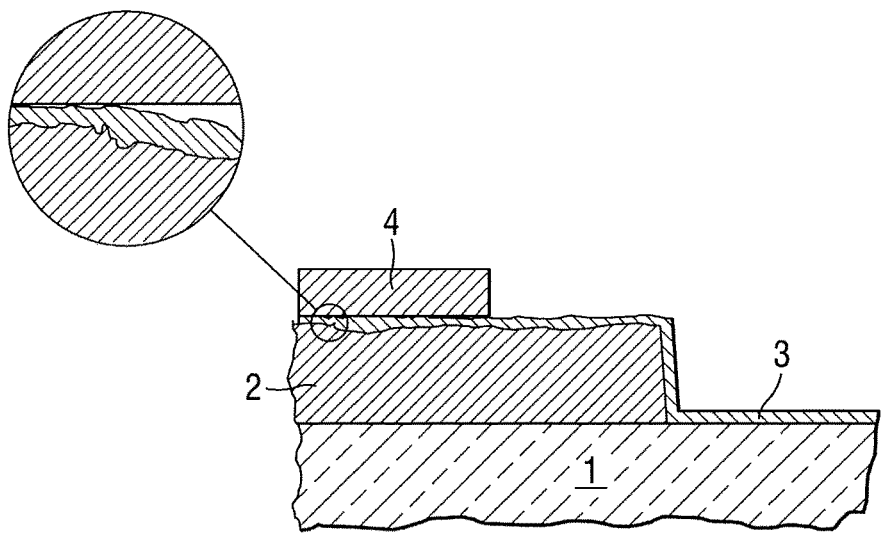
Figure 3:
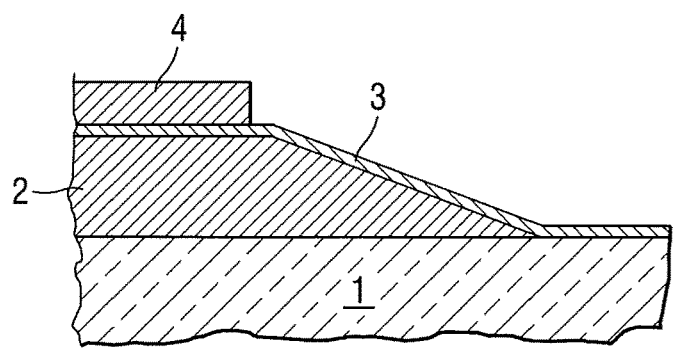

The invention is described in detail subsequently with reference to the figures, in which:

FIG. 1 exhibits, in diagrammatic section, an edge of a glass sheet comprising a conductive layer;

FIG. 2 diagrammatically illustrates the details of a product of the prior art;

FIG. 3 is a representation analogous to that of FIG. 2 according to forms of the invention.

In all the figures, the ratio of the dimensions is not respected for convenience of interpretation. A single glass sheet is presented in FIGS. 1 to 3. The arrangements undertaken relate to laminated glass panels additionally comprising a second glass sheet and an assembly interlayer formed of a thermoplastic material, generally PVB (polyvinyl butyral).

FIG. 1 exhibits in typical fashion a glass sheet 1 which comprises a system of conductive layers 3. These layers are applied to the sheet precoated on its edge with a masking enamel 2.

This system of layers is supplied with electricity by means of a busbar 4. The busbar is most frequently formed of a metal band, in particular of copper, of low thickness and with a width of a few millimeters. The conductivity of the busbar is very high in comparison with that of the conductive layers which, at the best, under conditions of high light transmission, exhibit a resistance which is not less than approximately 1Ω/□.

The representation of FIG. 1 corresponds, in a final laminated glass panel, to the sheet turned toward the outside of the vehicle. In order to mask the busbars but also the strands of glue which fix the second sheet to the bodywork elements of the vehicle, an opaque strip 2 is applied to the edge of the sheet 1 on the face which also comprises the system of conductive layers. The masking strip is in position 2, like the system of layers 3 which covers this strip. The busbar 4 is applied to the layer at the point where the latter covers the masking strip.

The order of the elements superimposed on the sheet is controlled by their respective functions.

The systems of layers are applied by vacuum deposition. Although of very low thicknesses, the layers formed are of great regularity over the entire surface of the coated sheet. This regularity relates in particular to the thickness of these layers. The application to the surface of the sheet does not detrimentally affect this regularity, these surfaces giving an extremely low roughness of the order of 0.02μ for the ordinary sheets produced by the float process on a bath of molten tin.

The application of the masking strips under the usual conditions of the screen printing techniques results in an enamel layer, the surface of which is much less smooth than that of the glass sheet. As indicated above, even with the most suitable previous screens, the roughness of the surface of the enamel strips is not less than 2 or 3μ. This roughness is to be compared with the normal thicknesses of the conductive layers of generally less than 0.1μ. In other words, even if the application of these layers by vacuum deposition techniques makes it possible to thoroughly cover the surface of the masking strips, without gaps, the layers deposited exhibit an irregular thickness and a degree of roughness derived from that of these masking strips on which they are applied and consequently a conduction which is not uniform, in particular due to the nonhomogeneities in thickness.

Furthermore, the reasons mentioned above, the contact of the conductive layers with the busbar, if the latter is formed of a metal band, cannot be completely assured. FIG. 2 illustrates, very diagrammatically, the defects related to the roughness of the masking strip.

These defects have the consequence of concentrating the circulation of the current in the layer in an irregular manner, resulting in the losses of power indicated in the presentation of the prior art.

A comparison is carried out between a glass panel, the masking strips of which are produced by screen printing in a conventional manner, and a glass panel, the masking strip of which is obtained by the inkjet method.

In both cases, the support is formed of a clear glass sheet with a thickness of 2.1 mm. The conductive layers are as described in the publication WO 2011/147875. They comprise three silver layers.

The roughness Ra is measured using a Handysurf TE H 042 device. For the layers produced by screen printing, the mean measurement is 0.69μ. For the layers applied by an inkjet technique, the roughness obtained is substantially reduced. Without having optimized all the factors which participate in its establishment, a mean roughness of the order of 0.14μ is obtained with a composition which is not specific, produced by Johnson-Matthey (JM1L6027).

The resistivity of the layers directly applied to the glass and that of the layer located on the masking strip are also measured. The measurement is carried out using a Stratometer device.

Under the conditions of the test, the measurement of the resistance of the layer on the glass alone becomes established at $0.82\Omega/\square$. On the enamel masking strip produced by conventional screen printing, this resistance is measured at $320\Omega/\square$, and that of the conductive layer applied to the enamel strip is of the order of $4\Omega/\square$. On the masking strip produced by the inkjet method, the resistance of the layer is approximately $2\Omega/\square$.

The presence alone of a masking layer, the roughness of which is lower, makes it possible to reduce by half the resistance of the layer to its contact, clearly showing the influence of this roughness on the conditions of supplying the heated layer. The reduction in the resistance imposed in the portion of the layer in contact with busbars is a factor which makes it possible to substantially improve the efficiency of the heating.

In order to further improve this efficiency, the masking strip is preferably of reduced thickness in order to minimize the threshold effect when the system of layers crosses this threshold on passing from the masking strip to the glass sheet. This same effect is also limited by producing a masking strip, the thickness of which is decreasing on the side of this strip turned toward the inside of the sheet. FIG. 3 diagrammatically illustrates such a decrease. The latter is not necessarily continuous and regular. In the event of superimposition of layers produced by the inkjet method, for example, the limits of each layer can result in a terracing with regard to the edge, each layer exhibiting a threshold limited to the thickness of the layer in question. Furthermore, if the sprayed composition exhibits a good affinity with the glass and with the layers previously deposited, a thickness which gradually decreases can be obtained in practice, facilitating the continuity of the conductive layer in the passage from the masking strip to the face of the glass sheet.

The invention claimed is:

1. A laminated motor vehicle glass panel, comprising:
two glass sheets united by an interlayer sheet;
a system of heated layers applied on one face of one of the sheets;
a substantially opaque masking strip on an edge of the one face having the system of heated layers, the masking strip in contact with the glass sheet face having the system of heated layers; and
electrical supply busbars in contact with the system of layers in a part covering the masking strip;
wherein the system of heated conductive layers covers, at least in part, the masking strip,
wherein the masking strip exhibits a roughness which is not greater than 0.5μ, and
wherein the masking strip is formed of an enamel including pigments, the pigments being in the form of particles, a mean particle size of which is not greater than 5μ.

2. The glass panel according to claim 1, wherein the system of heated conductive layers is formed by cathode sputtering and comprises an assembly of metal layers and of dielectric layers, the assembly exhibiting a thickness which is not greater than 0.1μ.

3. The glass panel according to claim 2, wherein the metal layers comprise silver and are two or three in number.

4. The glass panel according to claim 1, wherein the masking strip exhibits an opaqueness such that the light transmission of the glass panel through this strip remains less than 0.1%.

5. The glass panel according to claim 1, wherein the masking strip exhibits, transversely, a gradually decreasing thickness on its edge turned toward a center of the glass sheet.

6. The glass panel according to claim 1, wherein the masking strip is applied to the glass sheet by an inkjet technique.

7. The glass panel according to claim 6, wherein several applications of the inject technique are carried out in order to form the masking strip, the successive applications being carried out transversely set back on an edge turned toward a center of the glass sheet, set back with respect to a preceding application.

8. The glass panel according to claim 1, wherein the busbars are formed of thin metal bands.

9. The glass panel according to claim 1, wherein the glass sheet on which the system of heated conductive layers is applied is an external sheet of the laminated glass panel, the system being applied on a second face.

10. The glass panel according to claim 1, wherein the busbars are formed of metal bands.

11. The glass panel according to claim 1, wherein the masking strip is an enamel masking strip having a thickness of between 20 μm to 150 μm.

12. The glass panel according to claim 1, wherein the masking strip directly contacts the one face and wherein the system of heating layers also directly contacts the one face in an area of the face where no masking strip is present.

13. The glass panel according to claim 1, wherein, on a side facing a center of the glass sheet, the masking strip exhibits a sloped or terraced surface of decreasing thickness approaching an edge of the side.

14. A laminated motor vehicle glass panel, comprising:
two glass sheets united by an interlayer sheet;
a system of heated layers applied on one face of one of the sheets;
a substantially opaque masking strip on an edge of the one face having the system of heated layers, the masking strip in contact with the glass sheet face having the system of heated layers; and
electrical supply busbars in contact with the system of layers in a part covering the masking strip;
wherein the system of heated conductive layers covers, at least in part, the masking strip,
wherein the masking strip exhibits a roughness which is not greater than 0.5μ, and
wherein the system of heated conductive layers is formed by cathode sputtering and comprises an assembly of metal layers and of dielectric layers, the assembly exhibiting a thickness which is not greater than 0.1μ.

15. The glass panel according to claim 14, wherein, on a side facing a center of the glass sheet, the masking strip exhibits a sloped or terraced surface of decreasing thickness approaching an edge of the side.

16. The glass panel according to claim 14, wherein the masking strip is applied to the glass sheet by an inkjet technique.

17. The glass panel according to claim 14, wherein the masking strip is an enamel masking strip having a thickness of between 20 μm to 150 μm.

18. A laminated motor vehicle glass panel, comprising:
two glass sheets united by an interlayer sheet;
a system of heated layers applied on one face of one of the sheets;
a substantially opaque masking strip on an edge of the one face having the system of heated layers, the masking strip in contact with the glass sheet face having the system of heated layers; and
electrical supply busbars in contact with the system of layers in a part covering the masking strip;
wherein the system of heated conductive layers covers, at least in part, the masking strip,
wherein the masking strip exhibits a roughness which is not greater than 0.5μ, and
wherein, on a side facing a center of the glass sheet, the masking strip exhibits a sloped or terraced surface of decreasing thickness approaching an edge of the side.

19. The glass panel according to claim 18, wherein the masking strip is an enamel masking strip having a thickness of between 20 μm to 150 μm.

20. The glass panel according to claim 19, wherein the masking strip is formed of an enamel including pigments, the pigments being in the form of particles, a mean particle size of which is not greater than 5μ.

21. The glass panel according to claim 18, wherein the system of heated conductive layers is formed by cathode sputtering and comprises an assembly of metal layers and of dielectric layers, the assembly exhibiting a thickness which is not greater than 0.1μ.

\* \* \* \* \*